United States Patent [19]

Sterrett et al.

[11] 4,164,093

[45] Aug. 14, 1979

[54] MINI-INJECTOR

[75] Inventors: John P. Sterrett, Walkersville; Joseph P. Carroll, Frederick; Richard A. Creager, Walkersville, all of Md.

[73] Assignee: The United States of America, as represented by the Secretary of Agriculture, Washington, D.C.

[21] Appl. No.: 873,573

[22] Filed: Jan. 30, 1978

[51] Int. Cl.² .................. A01G 29/00; A01G 7/06
[52] U.S. Cl. ........................ 47/57.5; 7/125; 7/170; 128/218 R
[58] Field of Search .......... 47/1, 57.5; 7/125, 170; 128/215, 218 R, 224, 230, 234–238

[56] References Cited

U.S. PATENT DOCUMENTS

| 505,835 | 10/1893 | Kulp et al. ............... 7/125 X |
| 789,659 | 5/1905 | Kantorowicz ............... 47/1 |
| 2,261,368 | 11/1941 | Hecht ............... 47/57.5 X |
| 2,280,005 | 4/1942 | Petersen ............... 81/84 |
| 2,726,484 | 12/1955 | Simpkins ............... 47/1 |
| 3,156,087 | 11/1964 | Granberg ............... 7/125 X |
| 3,576,276 | 4/1971 | Clarke et al. ............... 47/57.5 X |
| 3,585,704 | 6/1971 | Schroeder ............... 7/125 X |

FOREIGN PATENT DOCUMENTS

| 489585 | 12/1929 | Fed. Rep. of Germany ........ 128/234 |
| 546372 | 6/1931 | Fed. Rep. of Germany ........ 128/215 |
| 647474 | 11/1928 | France ........ 128/215 |
| 17701 | 10/1898 | Switzerland ........ 47/57.5 |

OTHER PUBLICATIONS

Plant Dis. Reptr. 57: 338–341, 1973, "Pressure Apparatus . . . Into Trees".
Hort. Science, vol. 12, pp. 156–158, April 1977, "A Miniature . . . Branches".
Phytopathology 59: 1014, 1969, "A Technique . . . Pathogens".
USDA Forest Service Research Note NE-214, 1975.
Plant Dis. Reptr. 57: 513–514, 1973, "A New . . . Chemicals".
California Agriculture, 12/1976, "A Pressure . . . Trees".

Primary Examiner—Paul T. Sewell
Assistant Examiner—Steven A. Bratlie
Attorney, Agent, or Firm—M. Howard Silverstein; William E. Scott; David G. McConnell

[57] ABSTRACT

A modified locking-type wrench is combined with a disposable syringe and an injector barrel having a tapered tip to provide a mini-injector apparatus for injecting, under pressure, growth regulators and other solutions into the vascular systems of seedlings and branches of relatively small diameter woody plants.

1 Claim, 2 Drawing Figures

U.S. Patent  Aug. 14, 1979  4,164,093
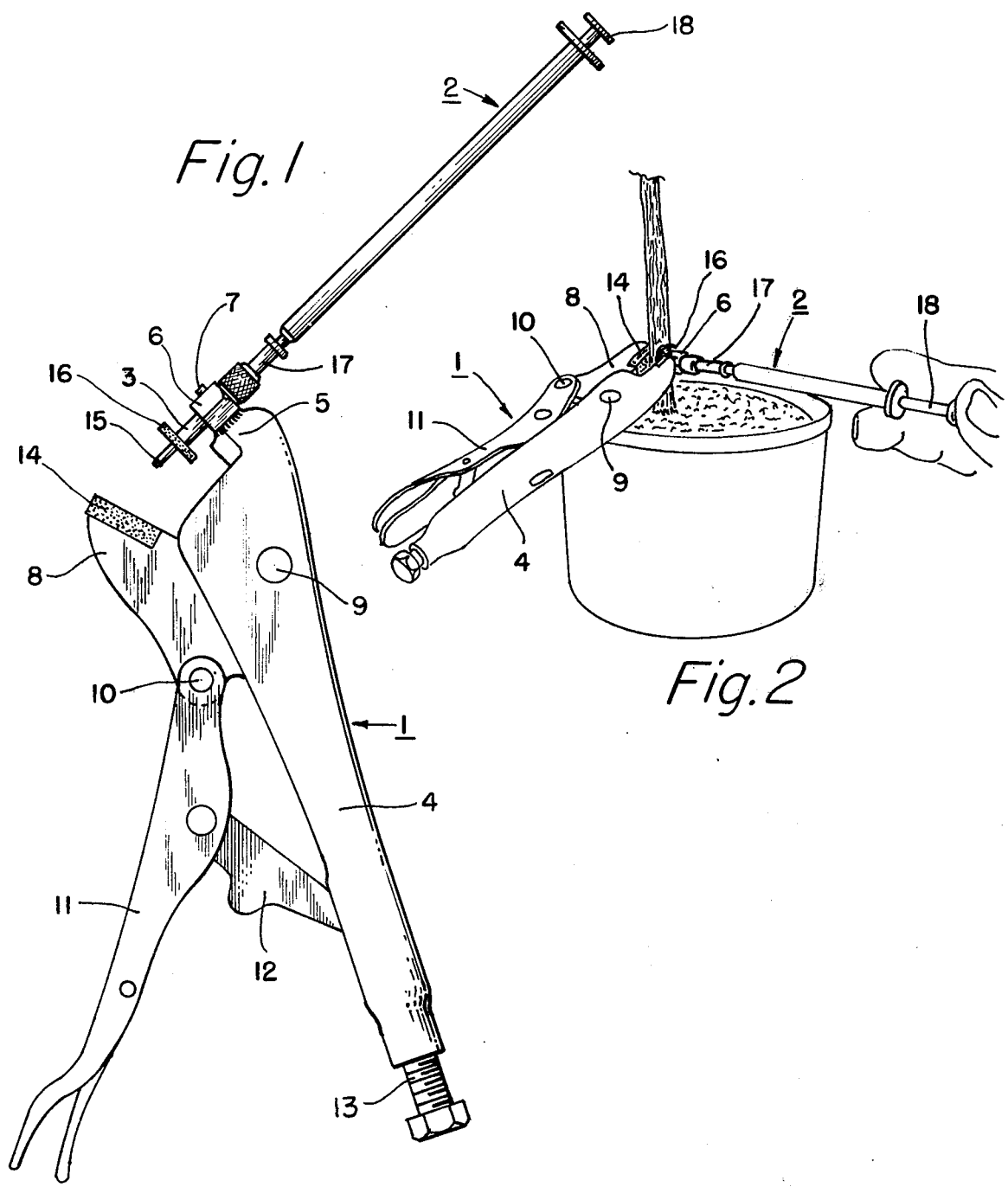

MINI-INJECTOR

BACKGROUND OF THE INVENTION

1. Field of the Invention

This invention relates to an apparatus for injecting, under pressure, growth regulators and other solutions into the vascular system of seedlings and branches of relatively small diameter woody plants.

2. Description of the Prior Art

There is no known pressure-type injector or system designed for use with seedlings and other small diameter stems, that is, stems having diameters from about 6 to 36 mm. Pressure-type injection systems and apparatus currently in use are designed for use on large trees and usually involve the use of high pressure pumping equipment (California Agriculture, December 1976, pgs. 4–5; USDA Forrest Service Research Note NE214, 1975; Plant Dis. Reporter 57, 338–341 and 513–514, 1973). The only known apparatus and methods for introducing chemicals or other materials into small stems other than the present invention, rely on gravity or transpirational forces and do not lend themselves to accurate or even near-accurate control of the volume of liquid transferred into the stems (Phytopathology 59, 1014, 1969). A description of the present invention is published in HortScience 12, 156–158, 1977.

BRIEF SUMMARY OF THE INVENTION

An object of this invention is to provide an apparatus for introducing measured amounts of plant growth regulators and other chemicals into the stems of seedlings and branches of woody plants having diameters less than 36 mm.

Another object is to provide a miniature pressure injector for injecting solutions under pressure into small diameter seedlings and branches.

A still further object is to provide an apparatus with which the volume of solution introduced into small diameter seedlings and branches can be accurately controlled.

In general, the above objects are accomplished by a mini-injector apparatus in which a locking-type wrench is combined with a disposable syringe to provide a means for wedging the injector barrel of the syringe into a pre-drilled hole in the stem of a seedling or the branch of a relatively small diameter woody plant to inject under pressure plant growth regulators and other substances into the stem or branch. The locking-type wrench has a handle member provided with a fixed jaw, a movable jaw pivotally attached to the handle member for coaction with the fixed jaw, means for adjusting the position of said fixed and movable jaws with respect to each other, and means for locking said fixed and movable jaws onto the stems and branches. The fixed jaw has been shortened to about one-half the length of the movable jaw and is provided with a means for mounting an injector barrel. An injector barrel having a tapered tip is mounted to the fixed jaw and a disposable syringe is mounted in the injector barrel.

BRIEF DESCRIPTION OF THE DRAWINGS

FIG. 1 is a side elevation view of the apparatus.
FIG. 2 is a perspective view of the apparatus in use.

DETAILED DESCRIPTION OF THE INVENTION

As shown in FIG. 1, locking-type wrench 1 is combined with disposable syringe 2 mounted in injector barrel 3 to provide the mini-injector of this invention. Locking-type wrench 1 is a well-known article of commerce and although there may be some construction differences among different brands of this type of wrench, the overall operational capabilities and functions of most of them are quite similar. The construction details of the wrench used in this invention are found in U.S. Pat. No. 2,280,005. Therefore, those details will not be repeated in this specification but will be considered as fully incorporated in the present description.

Handle member 4 is provided with fixed jaw 5 which has been shortened and flattened as shown in FIG. 1. Reamed hex stock 6 is permanently mounted to the flattened end of jaw 5 and is provided with set screw 7. For the purposes of this invention hex stock 6 was made of stainless steel and was silver soldered to jaw 5. However, the material from which hex stock 6 is made and the manner in which it is mounted on jaw 5 are not critical to the invention and other materials and methods of mounting would not affect the operational and functional capabilities of the invention. Movable jaw 8 is pivotally attached at 9 to handle member 4 and at 10 to elongated lever or operating handle 11. Fulcrum bar 12 in conjunction with shank 13 provide means for adjusting the position of movable jaw 8. The teeth on both fixed jaw 5 and movable jaw 8 are machined smooth and movable jaw 8 is provided with soft rubber pad 14 to prevent damage to the bark of the stems and branches on which the invention is used. Injector barrel 3, whose longitudinal axis is generally perpendicular to the longitudinal axis of fixed jaw 5, is mounted in reamed hex stock 6 and held in place by set screw 7. Injector barrel 3 is provided with rubber washer or spacer 16 to prevent bark damage to the stems and branches on which the apparatus is being used. Injector barrel 3 is also provided with tapered tip 15 which is a critical feature of the invention because, in operation, it is wedged into a pre-drilled hole in a stem or branch thereby providing a pressure tight seal and preventing leakage and loss of fluid. Disposable syringe 2 fits into hub flange 17 which is soldered or otherwise permanently attached to injector barrel 3.

For the purpose of demonstrating the practicality of this invention and for making an apparatus which would fit and operate satisfactorily when the diameter of the pre-drilled hole in a stem or branch is 5/64 inches, the apparatus was constructed with the following measurements:

(a) Length of taper on tip 15 was 2.4 mm;
(b) Angle of taper on tip 15 was 40°;
(c) Diameter of bore through injector barrel 3 was 1.04 mm;
(d) Capacity of syringe 2 was 1.0 ml;
(e) Inside diameter of syringe 2 was 4.4 mm;
(f) Thickness of washer or spacer 16 was 3.2 mm.

In operation, tapered tip 15 is inserted into a pre-drilled hole in a stem or branch and wedged in place by closing wrench 1 so that the branch or stem is between pad 14 of jaw 8 and tip 15. Prefilled syringe 2 is inserted into flange 17 and the solution in syringe 2 is forced into the vascular system of the stem or branch by means of piston or plunger 18. With an apparatus having the measurements described above, pressures of up to 400 psi are developed. Injection time is from about 3 to 60 seconds depending on the species and stage of growth of the stem or branch. Leakage around the pre-drilled injection hole is prevented by the design of the apparatus of this invention.

Although the apparatus used to demonstrate the feasibility and usefulness of the invention had the specifications and measurements noted above, other measurements can also be used successfully. As previously stated, the tapered tip on the injection barrel is a critical feature of the invention and the length and degree of taper should be such that the tip can be wedged into a pre-drilled hole in a stem or branch and provide a pressure tight seal to prevent leakage and loss of fluid.

We claim:

1. An apparatus for wedging an injector barrel of a disposable syringe into a predrilled hole in the stem of a seedling or in a branch of a relatively small diameter woody plant for introducing under pressure growth regulators and other solutions into the stem or branch comprising:

(a) a locking-type wrench having a handle member provided with a fixed jaw, a movable jaw pivotally attached to the handle member for coaction with the fixed jaw, means for adjusting the position of said fixed and movable jaws with respect to each other, and means for locking said fixed and movable jaws onto the foresaid stem or branch, the fixed jaw of said wrench being about one-half the length of the movable jaw and being provided with means for mounting an injector barrel;

(b) an injector barrel for a disposable syringe mounted to said fixed jaw;

(c) a tapered tip integrally joined to said injector barrel, said tip having a taper length of 2.4 mm and a taper angle of 40° to provide an effective pressure tight leakage preventative seal in a predrilled hole having a diameter of 5/64 inches, said seal being capable of preventing leakage at pressures up to 400 p.s.i.;

(d) a disposable syringe mounted in the foresaid injector barrel.

* * * * *